(12) United States Patent
Kim (10) Patent No.: US 11,589,016 B2
(45) Date of Patent: Feb. 21, 2023

(54) APPARATUS AND METHOD FOR RECORDING VIDEO IN VEHICLE

(71) Applicants: HYUNDAI MOTOR COMPANY, Seoul (KR); KIA CORPORATION, Seoul (KR)

(72) Inventor: Gyun Ha Kim, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/333,984

(22) Filed: May 28, 2021

(65) Prior Publication Data

US 2022/0132077 A1 Apr. 28, 2022

(30) Foreign Application Priority Data

Oct. 28, 2020 (KR) .................. 10-2020-0141555

(51) Int. Cl.
*H04N 7/18* (2006.01)
*H04N 5/232* (2006.01)
*H04N 5/77* (2006.01)

(52) U.S. Cl.
CPC .......... *H04N 7/188* (2013.01); *H04N 5/23245* (2013.01); *H04N 5/77* (2013.01)

(58) Field of Classification Search
CPC ....... H04N 5/23245; H04N 7/188; H04N 5/77
See application file for complete search history.

(56) References Cited

U.S. PATENT DOCUMENTS

2018/0367731 A1* 12/2018 Gatti ................ H04N 21/41422

FOREIGN PATENT DOCUMENTS

JP  2005199846 A  *  7/2005
KR  101888671 B1  *  8/2018

OTHER PUBLICATIONS

Texas Instruments TI Designs: TIDEP-0092, "Short Range Radar Reference Design Using AVVR1642," Apr. 2017—Revised Jan. 2018, 19 pp.

* cited by examiner

*Primary Examiner* — Girumsew Wendmagegn
(74) *Attorney, Agent, or Firm* — Lempia Summerfield Katz LLC (57) ABSTRACT

An apparatus for recording a video in a vehicle includes: a camera to obtain a video of surroundings of the vehicle, a first sensor to sense a surrounding motion of the vehicle, a second sensor to sense an impact from the surroundings of the vehicle, and a controller to determine a video recording mode of the camera, depending on whether the surrounding motion of the vehicle is consecutively made for a specific time period or more. In particular, the controller controls operations of the camera and the first sensor, depending the determined video recording mode. The video recording mode is controlled to reduce power consumption, in the state that it rains or snows when the video is recorded using a radar in parking.

17 Claims, 6 Drawing Sheets

Fig.1

| PERIODIC RECORDING MODE | FIRST MODE (BASIC MODE) | SECOND MODE | THIRD MODE |
|---|---|---|---|
| AMOUNT OR VARIATION OF WATER DROP SENSED BY RAIN SENSOR (FIVE PHASES IN TOTAL) | THIRD PHASE (AMOUNT OR VARIATION OF WATER DROP: MIDDLE) | FOURTH PHASE | FIFTH PHASE (AMOUNT OR VARIATION OF WATER DROP: HIGH) |
| OPERATING SITUATION | CAMERA & RADAR PAUSED FOR 10 SEC AFTER OPERATED FOR 10 SEC. | CAMERA & RADAR PAUSED FOR 10 SEC AFTER OPERATED FOR 5 SEC. | CAMERA & RADAR PAUSED FOR 10 SEC AFTER OPERATED FOR 3 SEC. |

Fig.2

| PERIODIC RECORDING MODE | FIRST MODE (BASIC MODE) | SECOND MODE | THIRD MODE |
|---|---|---|---|
| PHASE OF AMOUNT OF RAIN SENSED BY RAIN SENSOR (FIVE PHASES IN TOTAL) | THIRD PHASE (AMOUNT OR VARIATION OF WATER DROP: MIDDLE) | FOURTH PHASE | FIFTH PHASE (AMOUNT OR VARIATION OF WATER DROP: HIGH) |
| OPERATING SITUATION | CAMERA & RADAR PAUSED FOR 10 SEC AFTER OPERATED FOR 10 SEC. | CAMERA & RADAR PAUSED FOR 10 SEC AFTER OPERATED FOR 5 SEC. | CAMERA & RADAR PAUSED FOR 10 SEC AFTER OPERATED FOR 3 SEC. |
| WIPER OPERATED WHEN IMPACT SENSED, FIRST EMBODIMENT | X | O | O |
| WIPER OPERATED WHEN IMPACT SENSED, SECOND EMBODIMENT | X | X | O |

APPARATUS AND METHOD FOR RECORDING VIDEO IN VEHICLE

CROSS-REFERENCE TO RELATED APPLICATION

This application claims priority to and the benefit of Korean Patent Application No. 10-2020-0141555, filed on Oct. 28, 2020, the entire contents of which are incorporated herein by reference.

FIELD

The present disclosure relates to an apparatus and a method for recording a video in a vehicle.

BACKGROUND

The statements in this section merely provide background information related to the present disclosure and may not constitute prior art.

When a video of surroundings of a vehicle is consecutively recorded even through the vehicle is parked, power consumption of the vehicle may be increased to cause electric discharge of the vehicle. Accordingly, there has been suggested a manner of sensing the motion of a surrounding object of the vehicle by using a radar. For example, the video recording is performed when a camera senses the motion of the surrounding object of the vehicle, such that the consumption of a current used in recording of the vehicle is reduced or minimized.

However, we have discovered that since a radar reacts with an object having a dielectric substance, the motion of the object is consecutively determined as being sensed while it rains or snows. Accordingly, since a video is recorded by operating a camera while it rains or snows, unnecessary power may be wasted.

SUMMARY

The present disclosure has been made to solve the above-mentioned problems occurring in the prior art while advantages achieved by the prior art are maintained intact.

An aspect of the present disclosure provides an apparatus and a method for recording a video in a vehicle, capable of reducing power consumption by controlling a video recording mode in the situation that it rains or snows, when the vehicle is parked and video recording is performed by using the radar.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for recording a video in a vehicle may include: a camera to obtain a video of surroundings of the vehicle, a first sensor to sense a surrounding motion of the vehicle, a second sensor to sense an impact from the surroundings of the vehicle, and a controller to determine a video recording mode of the camera, depending on whether the surrounding motion of the vehicle is consecutively made for a specific time period or more, and control operations of the camera and the first sensor, depending on the determined video recording mode.

The controller may determine the video recording mode to a periodic recording mode, and control the camera and the first sensor to be repeatedly operated and paused, when the surrounding motion of the vehicle is sensed for a first time period or more.

The apparatus may further include a third sensor to sense a water drop on a surface of the vehicle.

In one form, when the surrounding motion of the vehicle is sensed for a second time period or more, and when the third sensor senses the water drop on the surface of the vehicle, the controller may determine the video recording mode as a periodic recording mode, and control the camera and the first sensor to be repeatedly operated and paused.

The controller may change operating times of the camera and the first sensor, depending on an amount of the water drop sensed by the third sensor.

The controller may reduce the operating times of the camera and the first senor, as the amount of the water drop sensed by the third sensor is increased, and control the camera and the first sensor to be operated for the reduced operating times.

The controller may control the second sensor to sense the impact from the surroundings of the vehicle, in a state that the camera and the first sensor are paused.

The controller may wake up the camera and control the camera to record the video for a third time period, after the impact is sensed, when the second sensor senses the impact from the surroundings of the vehicle, in the state that the camera and the first sensor are paused.

The controller may determine an operating mode of a wiper, depending on the video recording mode, after the impact is sensed.

In another form, when the surrounding motion of the vehicle is sensed for less than the specific time period, the controller may determine the video recording mode as a lower-power parking recording mode, start the operation of the camera after the motion is sensed, and perform the operation of the camera for the specific time period after the motion is terminated.

According to another aspect of the present disclosure, a method for recording a video in a vehicle may include: determining, by a controller, a video recording mode of a camera depending on whether a surrounding motion of the vehicle is consecutively made for a specific time period or more, and controlling operations of the camera and a first sensor, depending on the determined video recording mode.

The video recording mode may be determined as a periodic recording mode, and the camera and the first sensor may be controlled to be repeatedly operated and paused, when the surrounding motion of the vehicle is sensed for a first time period or more.

The video recording mode may be determined to a periodic recording mode, and the camera and the first sensor may be controlled to be repeatedly operated and paused, when the surrounding motion of the vehicle is sensed for a second time or more, and when a water drop on a surface of the vehicle is sensed.

The operating times of the camera and the senor may be reduced as the amount of the water drop on the surface of the vehicle is increased, and the camera and the first sensor may be controlled to be operated for the reduced operating times.

An impact from surroundings of the vehicle may be sensed by a second sensor in a state that the camera and the first sensor are paused.

The camera is waked up and the camera is controlled to perform the video recording for a third time, after the impact is sensed, when the impact is sensed from the surroundings of the vehicle by the second sensor, in the state that the camera and the first sensor are paused.

The method may further include determining an operating mode of a wiper, depending on the video recording mode, after the impact is sensed.

The video recording mode may be determined to a lower-power parking recording mode, the operation of the camera is started after the motion is sensed, and the operation of the camera may be performed for the specific time after the motion is terminated, when the surrounding motion of the vehicle is sensed for less than the specific time.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing the form of the present disclosure, a detailed description of well-known features or functions will be ruled out in order not to unnecessarily obscure the gist of the present disclosure.

In addition, in the following description of components according to an exemplary form of the present disclosure, the terms 'first', 'second', 'B', '(a)', and '(b)' may be used. These terms are merely intended to distinguish one component from another component, and the terms do not limit the nature, sequence or order of the constituent components. In addition, unless otherwise defined, all terms used herein, including technical or scientific tams, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
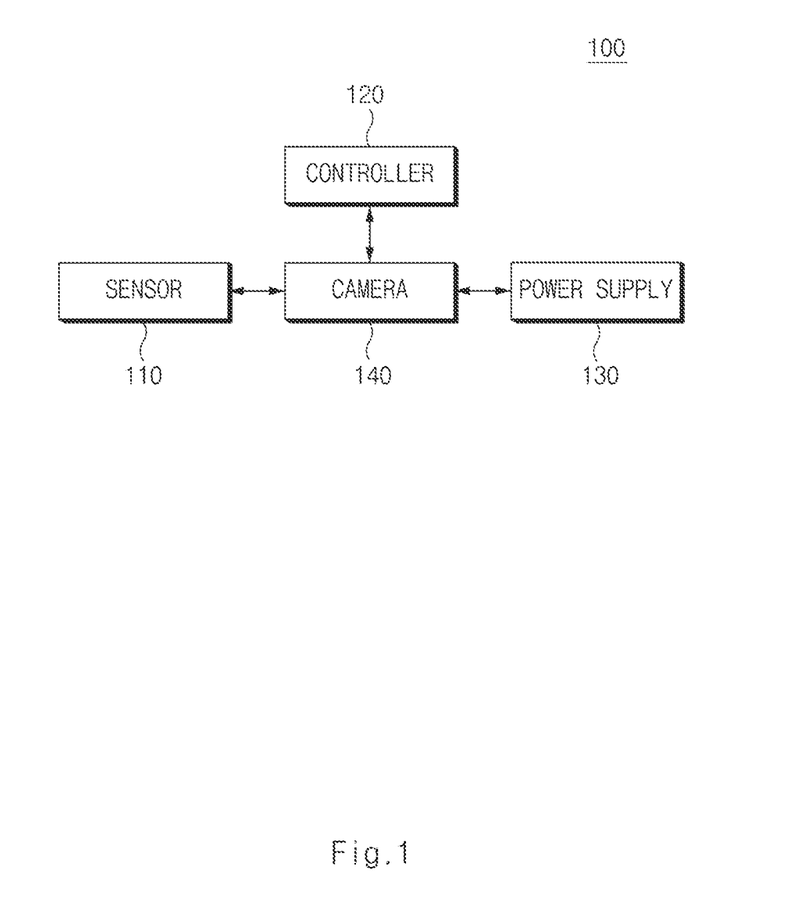
FIG. 1 is a view illustrating a configuration of an apparatus for recording a video in a vehicle, according to an exemplary form of the present disclosure.

FIG. 1 is a view illustrating a configuration of an apparatus for recording a video in a vehicle, according to an exemplary form of the present disclosure.

As illustrated in FIG. 1, in one form of the present disclosure, the apparatus 100 for recording the video in the vehicle may include a sensor 110, a camera 120, a power supply 130, and a controller 140.

The sensor 110 may sense the surrounding motion of the vehicle or the surrounding impact of the vehicle. According to an form of the present disclosure, the sensor 110 may sense the speed of an object having a dielectric constant to sense the surrounding motion of the vehicle, and may be implemented with a radar. The radar may be provided in a built-in camera mounted inside the vehicle, and may include a radar for an advanced driver assistance system (ADAS). According to another form of the present disclosure, when the radar for the ADAS is used, only an array (e.g. 2*2) smaller than an array (e.g., 4*4) of a radar may be used. Accordingly, only region within a specific distance is sensed to reduce power consumption. In addition, the sensor 110 may be implemented with an impact detection sensor (G sensor) to sense the surrounding impact of the vehicle.

In addition, the sensor 110 may include a rain sensor which senses water drops on the surface of the vehicle. The rain sensor may sense water drops on the surface of the vehicle through reflection of infrared rays. For example, the rain sensor may not determine the water drops as being sensed, when the infrared ray is regularly reflected, and may determine the water drops as being sensed, when the infrared ray is diffusely reflected. In addition, the rain sensor may classify the amount of water drops based on phases depending on the degree of diffuse reflection, and may sense a variation of the water drops. According to another form of the present disclosure, the rain sensor may classify the sensed amount of water drops into five phases. For example, the rain sensor may increase the phase, as the amount of water drops is increased or the variation of the water drops is increased.

The camera 120 may obtain a video of surroundings of the vehicle. According to another form of the present disclosure, a video of the surroundings of the vehicle may include a video in driving, a video in parking, a video when an event occurs, a video taken in front and rear portions of the vehicle, and a video taken in left and right portions of the vehicle. To this end, the camera 120 may be provided in the front and rear portions of the vehicle, and may be provided in the left and right portions of the vehicle.

The power supply 130 may supply power required when the controller 140 performs a control operation, and may include an auxiliary battery.

The controller 140 may be implemented with various processing devices, such as a microprocessor embedded therein with a semiconductor chip to operate or execute various instructions, and may control the overall operation of the apparatus for recording the video in the vehicle, according to another form of the present disclosure. In detail, the controller 140 may determine a video recording mode of the camera, depending on whether the surrounding motion of the vehicle is consecutively made for a specific time, and may control the operations of the camera and the sensor (radar) depending on the determined video recording mode.

The controller 140 may enter into a lower-power parking recording mode of recording a parking lot under lower power, when the vehicle is in a parking state. In this case, in the lower-power parking recording mode, the controller 140 may control the camera to be in a pausing state, and may control only the sensor (radar) to be maintained in an operating state, thereby sensing the surrounding motion of the vehicle.

The controller 140 may sense the surrounding motion of the vehicle in the state that only the radar is in the operating state. In this case, when the rain sensor is provided, the controller 140 may sense the surrounding motion of the vehicle by using the radar and the rain sensor together. In addition, when the rain sensor is not provided, the controller 140 may sense the surrounding motion of the vehicle by using only the radar. Hereinafter, the operation of the controller 140 will be described while distinguishing between the cases that the rain sensor is provided and not provided.

First, hereinafter, the operation of the controller 140 will be described regarding the case that the rain sensor is not provided.

The controller 140 may enter into the lower-power parking recording mode to execute an operation (general parking video recording operation) of generally recording a parking video. In this case, in the general parking video recording operation, the controller 140 may perform a control operation to start the operation of the camera after motion is sensed, and to perform the operation of the camera for a specific time (e.g., 10 seconds) after the motion is terminated.

In addition, the controller 140 may determine whether the surrounding motion of the vehicle is sensed for a first time or more. The controller 140 may determine (maintain) the video recording mode of the camera to the lower-power parking recording mode, when the surrounding motion of the vehicle is sensed for less than the first time (e.g., 10 minutes).

When the surrounding motion of the vehicle is determined as being sensed for the first time (e.g., 10 minutes) or more, the controller 140 may determine the state that it rains or snows outside the vehicle. When the surrounding motion of the vehicle is determined as being sensed for the first time (e.g., 10 minutes) or more, the controller 140 may determine the video recording mode of the camera to a periodic recording mode of periodically recording a video, and may control the camera and the sensor to be repeatedly operated and paused. According to another form of the present disclosure, the controller 140 may control the camera and the sensor (radar) to be repeatedly operated for the time 'A' (e.g., 10 second) and then paused for the time 'A'.

When the operation of the camera and the radar is executed for the time 'A', the controller 140 may determine whether the surrounding motion of the vehicle is sensed. When the operation of the camera and the radar is executed for the time 'A', the controller 140 may determine whether a number of times of motion sensed around the vehicle is '0' times. When the operation of the radar is executed for the time 'A', and when the controller 140 may not determine that the number of times of motion sensed around the vehicle is '0' times, the controller 140 may determine the surrounding situation as the situation that it rains or snows outside the vehicle. And the controller 140 may control the video recording mode of the camera to the periodic recording mode. Meanwhile, when the operation of the camera and the radar is executed for the time 'A', and when the controller 140 determines that the number of times of motion sensed around the vehicle is '0' times, the controller 140 may control the camera to enter into the lower-power parking recording mode and to perform the general parking video recording operation.

When the camera and the sensor are in a pausing state for the time 'A', the controller 140 may control the impact detection sensor to sense an impact from the surroundings of the vehicle. When the camera and the sensor (radar) are in the pausing state for the time 'A', and when the impact is sensed from the surroundings of the vehicle by the impact detection sensor, the controller 140 may wake up the camera and control the camera to perform the video recording operation for a predetermine time (e.g., 20 seconds) after the impact is sensed. When the camera and the sensor (radar) are in the pausing state for the time 'A', and when the impact is not sensed from the surroundings of the vehicle, the controller 140 may control the camera and the sensor to perform the periodic recording mode.

When an ignition is turned on or, a residual level of a battery is less than a threshold value, the controller 140 may release the lower-power parking recording mode. Otherwise, the controller 140 may perform a control operation to re-enter into the lower-power parking recording mode.

Hereinafter, the operation of the controller 140 will be described regarding the case that the rain sensor is provided, according to an exemplary form of the present disclosure.

The controller 140 may enter into the lower-power parking recording mode to perform the general parking video recording operation, when the vehicle is parked or stopped. In addition, the controller 140 may determine whether the surrounding motion of the vehicle is sensed for a second time (e.g., five minutes). The controller 140 may determine (maintain) the video recording mode of the camera to the lower-power parking recording mode, when the surrounding motion of the vehicle is sensed for less than the second time. According to another form of the present disclosure, when performing the general parking video recording operation, the controller 140 may perform a control operation to start the video recording operation of the camera after the motion is sensed and to perform the video recording operation of the camera for 10 seconds after the motion is terminated.

When the surrounding motion of the vehicle is determined as being sensed for the second time (e.g., five minutes), the controller 140 may determine the surrounding object of the vehicle as being consecutively moved or may determine the surrounding situation as the situation that it rains. The controller 140 may determine whether the rain sensor senses water drops on the surface of the vehicle. When the rain sensor senses the water drops on the surface of the vehicle, the controller 140 may determine the cause of the surrounding motion of the vehicle as rain or snow. Meanwhile, when the rain sensor is not determined as sensing the water drops on the surface of the vehicle, the controller 140 may perform a control operation to enter into the lower-power parking recording mode to perform the general parking video recording operation.

Meanwhile, when the rain sensor is determined as sensing the water drop on the surface of the vehicle, the controller 140 may determine the video recording mode of the camera as the periodic recording mode and may perform a control operation to repeatedly operate and pause the camera and the sensor (radar). According to an exemplary form of the present disclosure, the controller 140 may set the periodic recording mode depending on an amount or a variation of water drops sensed by the rain sensor on the surface of the vehicle. The controller 140 may classify modes into a first mode, a second mode, and a third mode depending on the amount or a variation of the water drops sensed by the rain sensor on the surface of the vehicle, and may set an operating time and a pausing time of the camera and the radar for each mode. For example, as the amount or the variation of the water drops sensed by the rain sensor on the surface of the vehicle is increased, the controller 140 may reduce the operating time of the camera and the radar and may control the camera and the radar to operate for the reduced operating time. The details thereof will be made with reference to FIG. 2.

Figure 2:
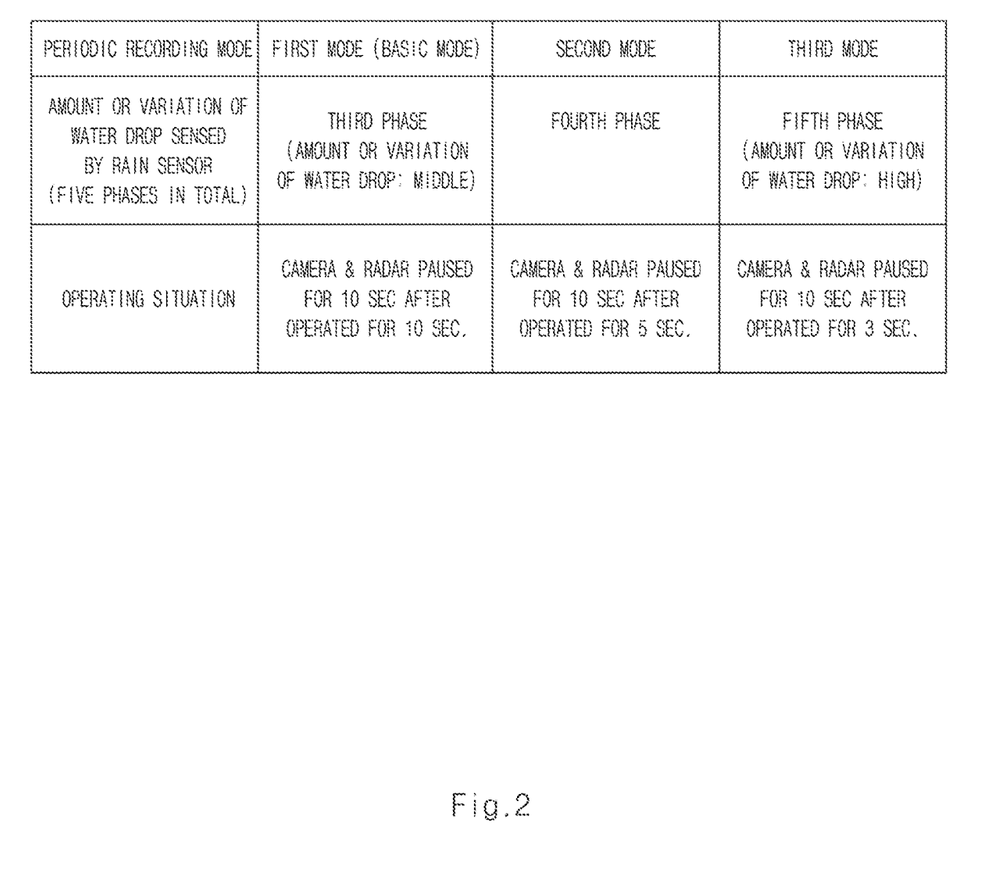
FIG. 2 is a view schematically illustrating a control operation in a periodic recording mode, according to an exemplary form of the present disclosure.

FIG. 2 is a view schematically illustrating a control operation in a periodic recording mode, according to another form of the present disclosure.

As illustrated in FIG. 2, the controller 140 may perform a control operation to repeatedly operate the camera and the radar for the time 'A.' (e.g., 10 seconds) and pause the camera and the radar for the time 'A', when the amount of water sensed by the rain sensor is in a third phase (the amount of water drop or the variation of the water drop: middle). In addition, the controller 140 may perform a control operation to repeatedly operate the camera and the radar for a time 'B' (e.g., 5 seconds) and pause the camera and the radar for the time 'A', when the amount of water sensed by the rain sensor is in a fourth phase (which is more increased than the third phase in the amount of water drop or the variation of the water drop). Further, the controller 140 may perform a control operation to repeatedly operate the camera and the radar for the time 'C' (e.g., 3 seconds) and pause the camera and the radar for the time 'A', when the amount of water sensed by the rain sensor is in a fifth phase (which is more increased than the fourth phase in the amount of water drop or the variation of the water drop). According to an exemplary form of the present disclosure, the pausing time is set to be equal, but the present disclosure is not limited thereto. In other words, the pausing time is variable.

When the camera and the radar are in the operating state, the controller 140 may determine whether the surrounding motion of the vehicle is sensed. According to another form, when the operation of the camera and the radar is executed for the time 'A', the controller 140 may determine whether the number of times sensed around the vehicle is '0' times. When the operation of the radar is executed for the time 'A', and when the controller 140 may not determine that the number of times sensed around the vehicle is '0' times, the controller 140 may determine the surrounding situation as the situation that it rains or snows outside the vehicle. And the controller 140 may determine (maintain) the video recording mode of the camera to the periodic recording mode.

Meanwhile, when the operation of the camera and the radar is executed for the time 'A', and when the controller 140 determines that the number of times of motion sensed around the vehicle is '0' times, the controller 140 may control the camera to enter into the lower-power parking recording mode and to perform the general parking video recording operation.

When the camera and the sensor are in a pausing state for the time 'A', the controller 140 may control the impact detection sensor to sense an impact from the surroundings of the vehicle. When the camera and the sensor (radar) are in a pausing state for the time 'A', and when the impact is sensed from the surroundings of the vehicle by the impact detection sensor, the controller 140 may wake up the camera and control the camera to perform the video recording operation for a predetermine time (e.g., 20 seconds) after the impact is sensed. According to an exemplary form of the present disclosure, the controller 140 may control the operation of a wiper to ensure the field of sight in the front and rear portions of the vehicle, and may set an operating mode of a wiper depending on the periodic recording mode. The details thereof will be made with reference to FIG. 3.

Figure 3:
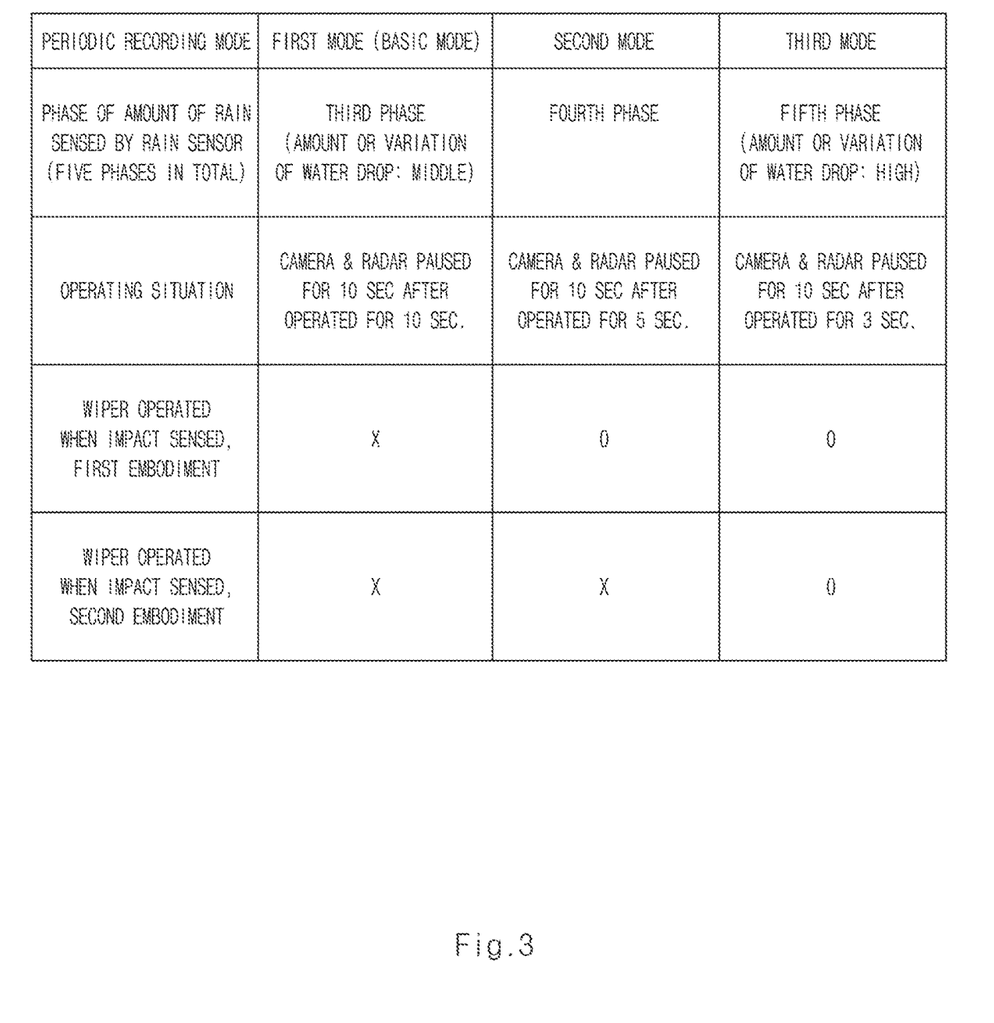
FIG. 3 is a view schematically illustrating a wiper operating mode, depending on a periodic recording mode according to one form of the present disclosure.

FIG. 3 is a view schematically illustrating a wiper operation, depending on the periodic recording mode according to the present disclosure.

As illustrated in FIG. 3, according to a first form, the controller 140 may perform a control operation to prevent a wiper from being operated when the periodic recording mode is in the first mode, and may control the wiper to operate when the periodic recording mode is in the second mode and the third mode, such that the field of sight is ensured in the front and rear portions of the vehicle, when the impact is sensed from the surroundings of the vehicle.

In addition, according to a second form, the controller 140 may perform a control operation to prevent the wiper from being operated when the periodic recording mode is the first mode and the second mode, and may control the wiper to operate when the periodic recording mode is the third mode, such that the field of sight is ensured in the front and rear portions of the vehicle, when the impact is sensed from the surroundings of the vehicle. The controller 140 operates the wiper in the above-described manner, thereby effectively controlling a wiper operation consuming a larger amount of a current.

Figure 4:
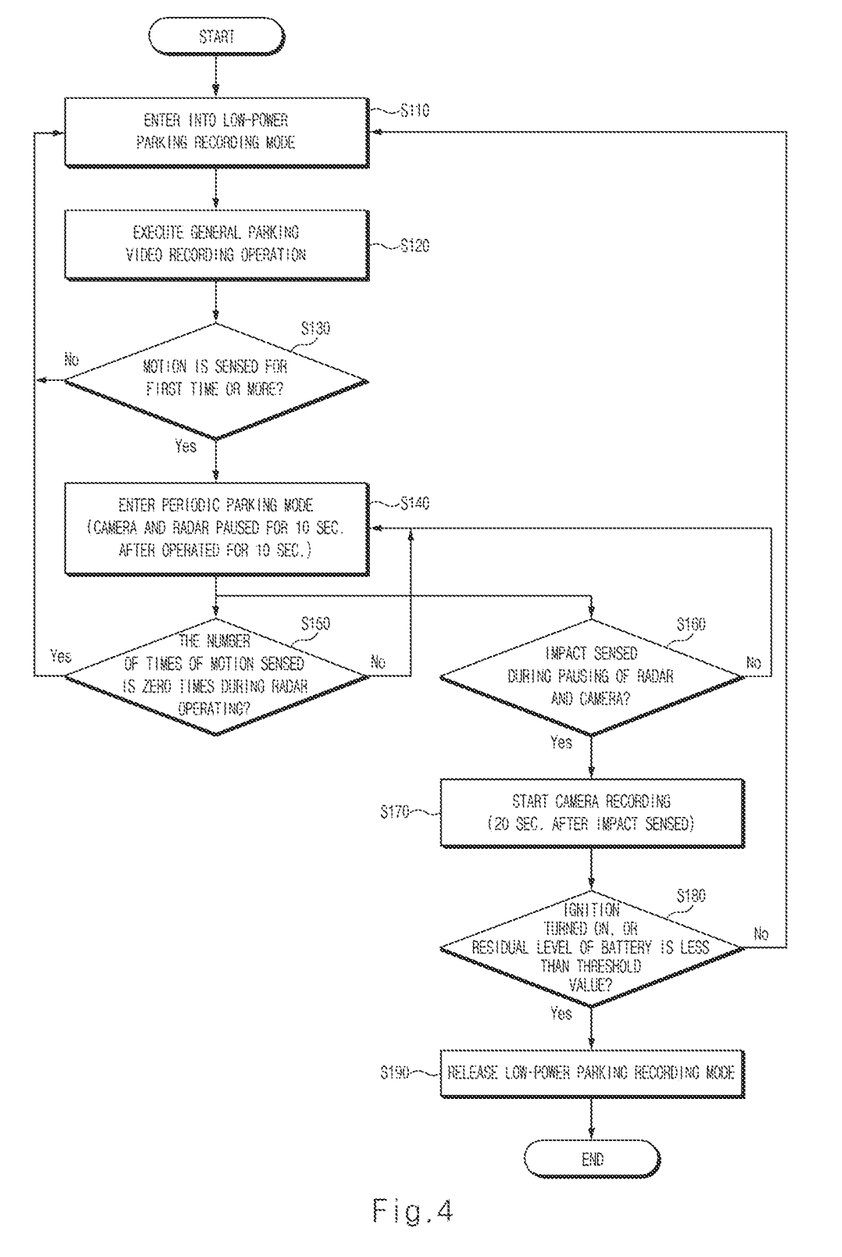
FIG. 4 is a flowchart illustrating a method for recording a video in a vehicle, according to an exemplary form of the present disclosure.

FIG. 4 is a flowchart illustrating a method for recording a video in a vehicle, according to an exemplary form of the present disclosure.

As illustrated in FIG. 4, the controller 140 may enter into the lower-power parking recording mode, when the vehicle is parked or stopped (S110). The controller 140 may perform the general parking video recording operation, after entering into the lower-power parking recording mode (S120). In S120, in the general parking video recording operation, the controller 140 may perform a control operation to start the operation of the camera after motion is sensed, and to perform the operation of the camera for a specific time (e.g., 10 seconds) after the motion is terminated.

In addition, the controller 140 may determine whether the surrounding motion of the vehicle is sensed for the first time or more (e.g., 10 minutes) (S130). When determining that the surrounding motion of the vehicle is sensed for less than the first time (No) in S130, the controller 140 may determine the video recording mode of the camera to the lower-power parking recording mode and may perform the general parking video recording operation (S110 and S120).

When determining that the surrounding motion of the vehicle is sensed for the first time or more (Yes) in S130, the controller 140 may determine the surrounding situation as the situation that it rains or snows outside the vehicle, may determine the video recording mode of the camera to the periodic recording mode. And the controller 140 may control the camera and the sensor to be repeatedly operated and paused (S140). When the operation of the camera and the sensor (radar) is executed (e.g., when the operation of the camera and the sensor is executed for the time 'A.' (e.g., 10 seconds)) as an example in S140, the controller 140 may determine whether the surrounding motion of the vehicle is sensed. According to another form, when the operation of the camera and the radar is executed for the time 'A', the controller 140 may determine whether the number of times of motion sensed around vehicle is '0' times (S150).

When the controller 150 may not determine that the number of times of motion sensed around the vehicle is '0' times (No) in S150, the controller 140 may determine the surrounding situation as the situation that it rains or snows outside the vehicle, and may control the video recording mode of the camera to the periodic recording mode. Meanwhile, when the controller 140 determines that the number of times of motion sensed around the vehicle is '0' times (Yes), the controller 140 may control the camera to enter into the lower-power parking recording mode and to perform the general parking video recording operation (S110 and S120).

When the camera and the sensor are in a pausing state (e.g., when the camera and the sensor are in the pausing state for the time 'A' (e.g., 10 seconds)), the controller 140 may control the impact detection sensor to sense an impact from the surroundings of the vehicle (S160). When the camera and the sensor (radar) are in the pausing state for the time 'A', and when the impact is sensed from the surroundings of the vehicle by the impact detection sensor (Yes) in S160, the controller 140 may wake up the camera and control the camera to perform the video recording operation for the predetermine time (e.g., 20 seconds) after the impact is sensed (S170). When the impact is not sensed from the surroundings of the vehicle (No) in S160, the controller 140 may perform the periodic recording mode (S140).

The controller 140 may determine whether an ignition is turned on, or a residual level of a battery is less than a threshold value (S180). When the ignition is turned on or the residual level of a battery is less than the threshold value (Yes) in S180, the controller 140 may release the lower-power parking recording mode (S190). When the ignition is not turned on or the residual level of the battery exceeds the threshold value (No) in S180, the controller 140 may perform the control operation to re-enter into the lower-power parking recording mode (S110).

Figure 5:
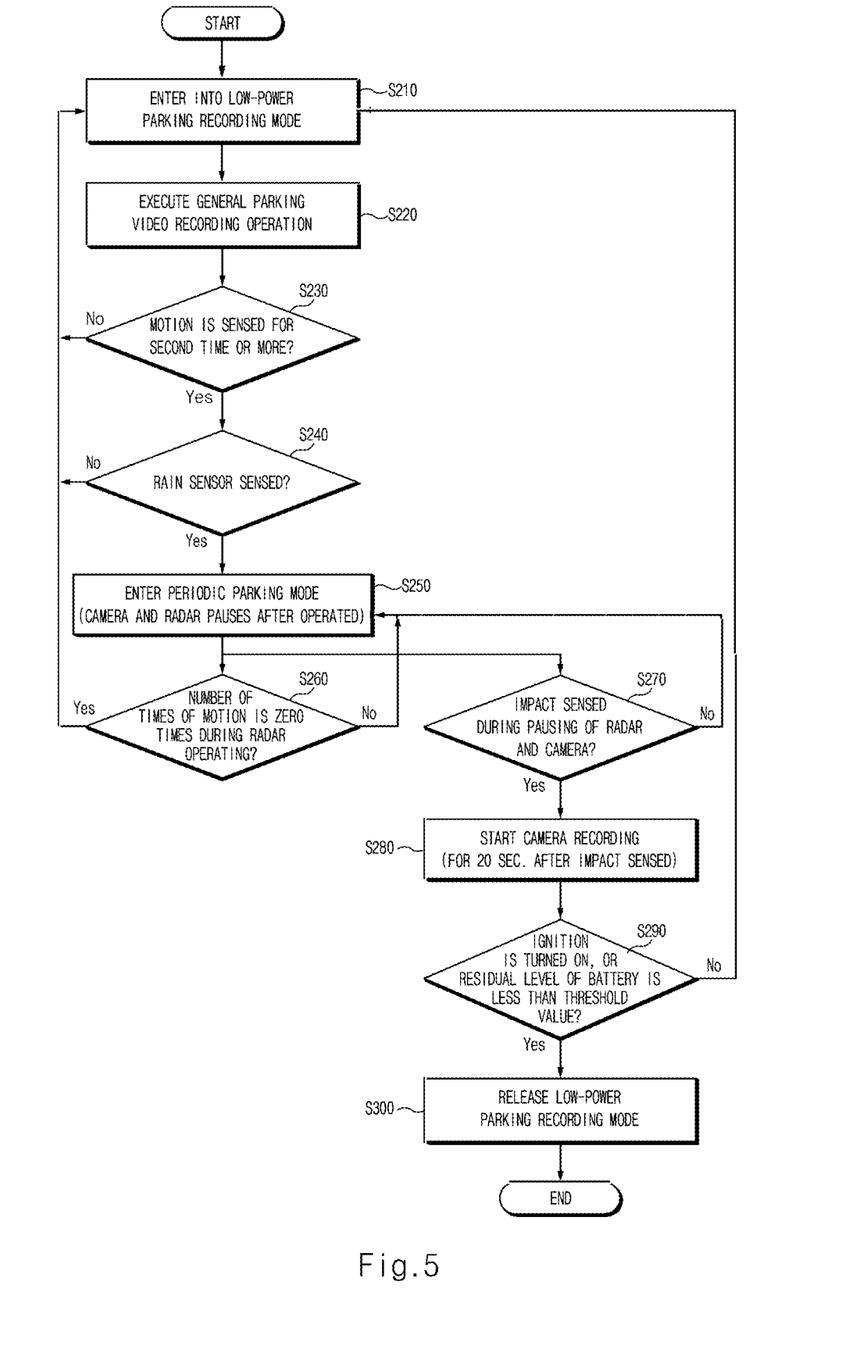
FIG. 5 is a flowchart illustrating a method for recording a video in a vehicle, according to another form of the present disclosure.

FIG. 5 is a flowchart illustrating a method for recording a video in a vehicle, according to another form of the present disclosure.

As illustrated in FIG. 5, the controller 140 may enter into the lower-power parking recording mode when the vehicle is parked or stopped (S210). The controller 140 may perform the general parking video recording operation, after entering into the lower-power parking recording mode (S220). In the general parking video recording operation in S220, the controller 140 may perform a control operation to start the operation of the camera after motion is sensed, and to perform the operation of the camera for a specific time (e.g., 10 seconds) after the motion is terminated.

In addition, the controller 140 may determine whether the surrounding motion of the vehicle is sensed for the second time or more (e.g., 5 minutes) (S230). When determining that the surrounding motion of the vehicle is sensed for less than the second time (No) in S230, the controller 140 may determine the video recording mode of the camera to the lower-power parking recording mode and may perform the general parking video recording operation (S210 and S220).

When determining that the surrounding motion of the vehicle is sensed for the second time or more (Yes) in S230, the controller 140 may determine whether the rain sensor senses the water drop on the surface of the vehicle (S240). When determining the rain sensor as sensing the water drop on the surface of the vehicle (Yes) in S240, the controller 140 may determine the video recording mode of the camera as the periodic recording mode, and may perform the control operation to repeatedly operate and pause the camera and the sensor (S250). In S250, as the amount or the variation of the water drop sensed by the rain sensor on the surface of the vehicle is increased, the controller 140 may reduce the operating time of the camera and the radar and may control the camera and the radar to operate for the reduced operating time. The details thereof may be understood by making reference to the description made with reference to FIG. 2. When the water drop is not determined as being sensed in S240, the controller 140 may perform S210.

When the camera and the radar are in the operating state, the controller 140 may determine whether the surrounding motion of the vehicle is sensed. According to an exemplary form, the controller 140 may determine whether the number of times of motion sensed around the vehicle is '0' times (S260). When the controller 260 may not determine that the number of times of motion sensed around the vehicle is '0' times (No) in S260, the controller 140 may determine the surrounding situation as the situation that it rains or snows outside the vehicle, and may determine (maintain) the video recording mode of the camera to the periodic recording mode (S250).

Meanwhile, when the controller 140 determines that the number of times of motion sensed around the vehicle is '0' times during the operation of the radar in S260, the controller 140 may enter the lower-power parking recording mode and may control the camera to perform the general parking video recording operation (S210 and S220).

When the camera and the sensor are in the pausing state, the controller 140 may control the impact detection sensor to sense an impact from the surroundings of the vehicle. When the camera and the sensor are in the pausing state, and when the impact is sensed from the surroundings of the vehicle by the impact detection sensor, the controller 140 may wake up the camera and control the camera to perform the video recording operation for a predetermine time (e.g., 20 seconds) (S280). The controller 140 may control the wiper operation in the video recording operation such that the field of sight in the front and rear portions of the vehicle is ensured, and may set the wiper operating mode depending on the periodic recording mode in S280. The details of the wiper operating mode may be understood by making reference to FIG. 3.

The controller 140 may determine whether an ignition is turned on or a residual level of a battery is less than a threshold value (S290). The controller 140 may release the lower-power parking recording mode, when the ignition is turned on or the residual level of the battery is less than the threshold value in S290 (S300). When the ignition is not turned on or the residual level of the battery exceeds the threshold value (No), the controller 140 may perform a control operation to re-enter into the lower-power parking recording mode (S210).

Figure 6:
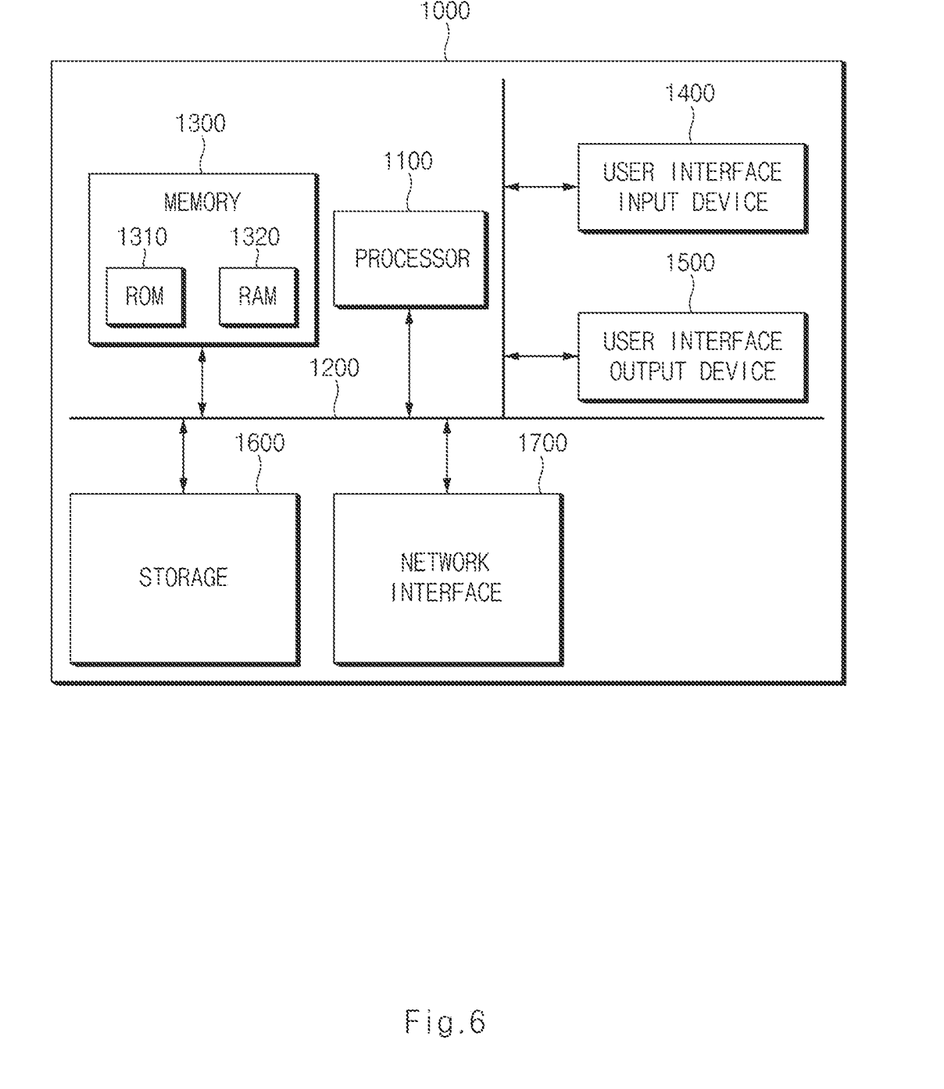
FIG. 6 is a block diagram illustrating a computing system to execute the method performed according to an exemplary form of the present disclosure.

FIG. 6 is a block diagram illustrating a computing system to execute the method according to an exemplary form of the present disclosure.

Referring to FIG. 6, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM; see 1310) and a random access memory (RAM; see 1320).

Thus, the operations of the methods or algorithms described in connection with the exemplary forms disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

According to another form of the present disclosure, in the apparatus and the method for recording the video in the vehicle, when the video recording is performed by using the radar, the video recording mode is controlled in the situation that it rains or snows, thereby reducing current consumption. In addition, surrounding information may be easily obtained by properly removing snow or rainwater in the situation that it rains or snows.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary forms of the present disclosure are provided to explain the spirit and scope of the present disclosure, but not to limit them, so that the spirit and scope of the present disclosure is not limited by the forms. The scope of the present disclosure should be construed on the basis of the accompanying claims, and all the technical ideas within the scope equivalent to the claims should be included in the scope of the present disclosure.

What is claimed is:

1. An apparatus for recording a video in a vehicle, the apparatus comprising:
    a camera configured to obtain a video of surroundings of the vehicle;
    a first sensor configured to sense a surrounding motion of the vehicle;
    a second sensor configured to sense an impact from the surroundings of the vehicle; and
    a controller configured to:
        determine a video recording mode of the camera, based on whether the surrounding motion of the vehicle is consecutively made for a specific time period or more, and
        control operations of the camera and the first sensor, based on the video recording mode,
    wherein when the surrounding motion of the vehicle is consecutively detected for a first time period or more, the controller is configured to:
        determine the video recording mode as a periodic recording mode; and
        control the camera and the first sensor to be repeatedly operated and paused in the periodic recording mode.

2. The apparatus of claim 1, further comprising:
    a third sensor configured to detect a water drop on a surface of the vehicle.

3. The apparatus of claim 2, wherein when the surrounding motion of the vehicle is consecutively detected for a second time period or more, and when the third sensor detects the water drop on the surface of the vehicle, the controller is configured to:
    determine the video recording mode as the periodic recording mode; and
    control the camera and the first sensor to be repeatedly operated and paused.

4. The apparatus of claim 2, wherein the controller is configured to:
    change operating times of the camera and the first sensor, based on an amount of the water drop sensed by the third sensor.

5. The apparatus of claim 4, wherein the controller is configured to:
    reduce the operating times of the camera and the first sensor, as the amount of the water drop detected by the third sensor is increased; and
    control the camera and the first sensor to be operated for the reduced operating times.

6. The apparatus of claim 2, wherein the controller is configured to:
    control the second sensor to sense the impact from the surroundings of the vehicle, in a state that the camera and the first sensor are paused.

7. The apparatus of claim 6, wherein when the second sensor senses the impact from the surroundings of the vehicle, in the state that the camera and the first sensor are paused, the controller is configured to:
    wake up the camera and control the camera to record the video for a third time period after the impact is sensed.

8. The apparatus of claim 6, wherein when the impact is sensed, the controller is configured to:
    determine an operating mode of a wiper based on the video recording mode.

9. The apparatus of claim 1, wherein when the surrounding motion is sensed for less than the specific time period, the controller is configured to:
    determine the video recording mode as a lower-power parking recording mode;
    operate the camera after the surrounding motion is sensed; and
    perform the operation of the camera for a predetermine time period after the surrounding motion is terminated.

10. A method for recording a video in a vehicle, the method comprising:
    determining, by a controller, a video recording mode of a camera based on whether a surrounding motion of the vehicle is consecutively detected for a specific time period or more; and
    controlling, by the controller, operations of the camera and a first sensor, based on the video recording mode,
    wherein in response to determining that the surrounding motion of the vehicle is consecutively detected for a first time period or more, the video recording mode is determined as a periodic recording mode, and the camera and the first sensor are controlled to be repeatedly operated and paused in the periodic recording mode.

11. The method of claim 10, wherein in response to determining that the surrounding motion of the vehicle is detected for a second time period or more, and a water drop on a surface of the vehicle is detected, the video recording mode is determined as the periodic recording mode, and the camera and the first sensor are controlled to be repeatedly operated and paused in the periodic recording mode.

12. The method of claim 11, wherein operating times of the camera and the first sensor are changed based on an amount of the water drop on the surface of the vehicle.

13. The method of claim 12, wherein the operating times of the camera and the first sensor are reduced as the amount of the water drop on the surface of the vehicle is increased, and wherein the camera and the first sensor are controlled to be operated for a reduced operating times.

14. The method of claim 10, further comprising: sensing, by a second sensor, an impact from surroundings of the vehicle in a state that the camera and the first sensor are paused.

15. The method of claim 14, further comprising:
in response to the impact sensed by the second sensor, waking up, by the controller, the camera and performing the video recording for a third time period after the sensed impact.

16. The method of claim 15, further comprising:
determining, by the controller, an operating mode of a wiper based on the video recording mode, after the impact is sensed.

17. The method of claim 10, further comprising:
in response to determining that the surrounding motion of the vehicle is detected for less than the specific time period, determining, by the controller, the video recording mode as a lower-power parking recording mode in which the camera is operated after the surrounding motion is detected and the operation of the camera is performed for a predetermine time period after the surrounding motion is terminated.

* * * * *